(12) United States Patent
Chiang (10) Patent No.: US 11,975,497 B2
(45) Date of Patent: May 7, 2024

(54) METHOD OF MANUFACTURING COMPONENT

(71) Applicant: YMA CORPORATION, Taichung (TW)

(72) Inventor: Jing-Bin Chiang, Taichung (TW)

(73) Assignee: YMA CORPORATION, Taichung (TW)

( * ) Notice: Subject to any disclaimer, the term of this patent is extended or adjusted under 35 U.S.C. 154(b) by 72 days.

(21) Appl. No.: 17/490,749

(22) Filed: Sep. 30, 2021

(65) Prior Publication Data
US 2022/0194026 A1 Jun. 23, 2022

(30) Foreign Application Priority Data
Dec. 17, 2020 (TW) ................................ 109144726

(51) Int. Cl.
| | | |
|---|---|---|
| B29C 70/44 | (2006.01) | |
| B29C 35/08 | (2006.01) | |
| B29K 307/04 | (2006.01) | |
| B29L 31/30 | (2006.01) | |

(52) U.S. Cl.
CPC .......... B29C 70/44 (2013.01); B29C 35/0805 (2013.01); *B29C 2035/0855* (2013.01); *B29K 2307/04* (2013.01); *B29L 2031/3091* (2013.01)

(58) Field of Classification Search
CPC ................ B29C 70/44; B29C 35/0805; B29C 70/68–80; B29C 70/40–48; B29C 2035/0855
See application file for complete search history.

(56) References Cited

U.S. PATENT DOCUMENTS

| | | | | |
|---|---|---|---|---|
| 6,270,104 | B1* | 8/2001 | Nelson .................. | B62K 19/22 280/281.1 |
| 6,340,509 | B1* | 1/2002 | Nelson .................. | B62K 19/16 280/281.1 |
| 2004/0016100 | A1* | 1/2004 | Van Lenthe .......... | B29C 57/08 29/447 |
| 2004/0157519 | A1* | 8/2004 | Goodell ................ | B32B 5/28 442/181 |
| 2011/0031433 | A1* | 2/2011 | Burchell .............. | B29C 70/025 264/219 |

* cited by examiner

*Primary Examiner* — Philip C Tucker
*Assistant Examiner* — Andrew L Swanson
(74) *Attorney, Agent, or Firm* — MUNCY, GEISSLER, OLDS & LOWE, P.C.

(57) ABSTRACT

A method of manufacturing a component by using a carbon fiber composite material capable of absorbing microwaves. The method includes the step of providing a mold made of materials that is penetrated by the microwaves and have a mold cavity inside, cladding the carbon fiber composite material on an inflatable member and placing the inflatable member cladded with the carbon fiber composite material in the mold cavity, softening the carbon fiber composite material by microwave heating, and inflating the softened carbon fiber composite materials through the inflatable member for enabling the softened carbon fiber composite materials to be formed and solidified in the mold cavity to obtain the component. By means of the aforesaid method, the throughput time of manufacturing the component can be effectively shortened.

6 Claims, 14 Drawing Sheets

METHOD OF MANUFACTURING COMPONENT

BACKGROUND OF THE INVENTION

1. Field of the Invention

The present invention relates to a method of manufacturing a component and more particularly, to a method that can effectively shorten the throughput time of manufacturing the component.

2. Description of the Related Art

Traditionally, components of premium bicycles (such as the frame of a racing bicycle) are mostly made of carbon fiber composite materials. Based on the material characteristics of the carbon fiber composite materials with high structural strength and low weight, the bicycle frame made of the aforesaid materials has sufficient structural strength and can also greatly reduce the overall weight of the bicycle.

Traditionally, the method of manufacturing the aforesaid bicycle components uses a heat medium (such as hot steam or hot kerosene) to heat a mold by heat conduction, such that the blank of the carbon fiber composite materials in the mold is softened and heated up to a specific temperature to produce a crosslinking reaction. By this way, the components with high structural strength and low weight are obtained. However, the aforesaid method is quite time-consuming, and it is also easy to cause heat loss due to the thermal energy of the heating medium escaping into the environment. It can be seen that the conventional method of manufacturing bicycle components still has room for improvement.

In addition, in order to improve the aforesaid problems of time-consuming and heat loss, a known prior art method uses microwaves to heat and form the component. However, during the step of using the microwaves to heat and form the component, if the size of the to-be-formed component is larger, the problem of uneven heating may occur in different parts of the to-be-formed component. Therefore, it is necessary to wait for a period of time in the process to make each part of the to-be-formed component have a uniform temperature and reach a process temperature at the same time to produce the crosslinking reaction. As such, the known prior art method will lengthen the overall manufacturing time.

SUMMARY OF THE INVENTION

It is a primary objective of the present invention to provide a method of manufacturing a component, which can effectively shorten the throughput time of manufacturing the component.

It is a secondary objective of the present invention to provide a method of manufacturing the component, which can effectively reduce energy consumption.

To attain the above objectives, the method of the present invention is used to manufacture the component by using a carbon fiber composite material capable of absorbing microwaves. The method of the present invention comprises the steps of providing a mold made of a material that is penetrated by the microwaves and has a mold cavity inside, cladding the carbon fiber composite material on an inflatable member and placing the inflatable member cladded with the carbon fiber composite material in the mold cavity, softening the carbon fiber composite material by microwave heating, and inflating the softened carbon fiber composite material through the inflatable member to enable the softened carbon fiber composite material to be formed and solidified in the mold cavity to obtain the component.

It can be understood from the above illustration that the method of the present invention uses the microwaves to heat the carbon fiber composite material. The heating rate using the microwaves is faster than the heating rate using the traditional heat medium, such that the throughput time of manufacturing the component can be greatly reduced. Further, the use of microwave heating does not cause the problem of heat loss due to the thermal energy of the heating medium escaping into the environment so as to achieve energy saving effect and reduce energy consumption.

In addition, the present invention also provides a method of manufacturing the component by using the carbon fiber composite material capable of absorbing the microwaves. The method of the present invention comprises the steps of providing a mold made of a material that is penetrated by the microwaves and has a mold cavity inside provided with a component forming area and a slice forming area connected with component forming area, placing the carbon fiber composite material in the mold cavity, softening the carbon fiber composite material by microwave heating to enable the softened carbon fiber composite materials to be formed into a shaped object in the mold cavity, wherein the shaped object has the component formed in the component forming area and a slice connected with the component and formed in the slice forming area, solidifying the shaped object, and removing the slice of the shaped object to obtain the component unconnected with the slice.

It can be understood from the above illustration that in the process of using microwave heating, the microwaves are easily absorbed by the slice to heat the slice. Therefore, the slice can transfer heat quickly to the area where the slice and the component are connected, such that each part of the component can quickly reach a uniform temperature, thereby effectively shortening the throughput time of manufacturing the component.

On one side, the component can be, but limited to a bicycle frame.

On another side, in the process of using the microwaves to heat the carbon fiber composite material, the phenomenon of tip discharge may occur at the tip of the carbon fiber composite material cladding on the inflatable member to damage the mold. In order to avoid the above problem, one of the solutions is that the carbon fiber composite material cladding on the inflatable member is installed on a metal sleeve. The metal sleeve has a large diameter portion and a small diameter portion connected with the large diameter portion. The large diameter portion has an abutting flange abutted against an end edge (may be one or more) of the carbon fiber composite material. Finally, a sleeve receiving area is provided in the mold cavity for receiving the metal sleeve. Therefore, in the process of using microwave heating, a part of the microwaves is shielded by the metal sleeve to prevent the phenomenon of tip discharge occurred at the end edge of the carbon fiber composite material.

On another side, if the to-be-formed component is hollow, in the step of placing the carbon fiber composite material in the mold cavity further comprises cladding the carbon fiber composite material on an inflatable member, and placing the inflatable member cladding with the carbon fiber composite material in the mold cavity for blow forming. In addition, in order to install the inflatable member conveniently, the metal sleeve can be designed to provide a through hole for allowing the inflatable member to pass through.

On another side, a flow channel can be provided at the outer surface of the metal sleeve. In the step of solidifying the shaped object, a coolant is allowed to flow into the flow channel for cooling the metal sleeve and the shaped object so as to solidify the shaped object.

Other advantages and features of the present invention will be fully understood by reference to the following specification in conjunction with the accompanying drawings, in which like reference signs denote like components of structure.

DETAILED DESCRIPTION OF THE INVENTION

It should be understood by those skilled in the related art that all the terms used in the contents of the specification are for illustrative description. The directional terms mentioned in the contents of the specification, such as 'front', 'on', 'down'. 'rear'. 'left', 'right', 'top', 'bottom', 'inside', and 'outside', are also just for illustrative description on the basis of normal usage direction, not intended to limit the claimed scope.

Figure 1:
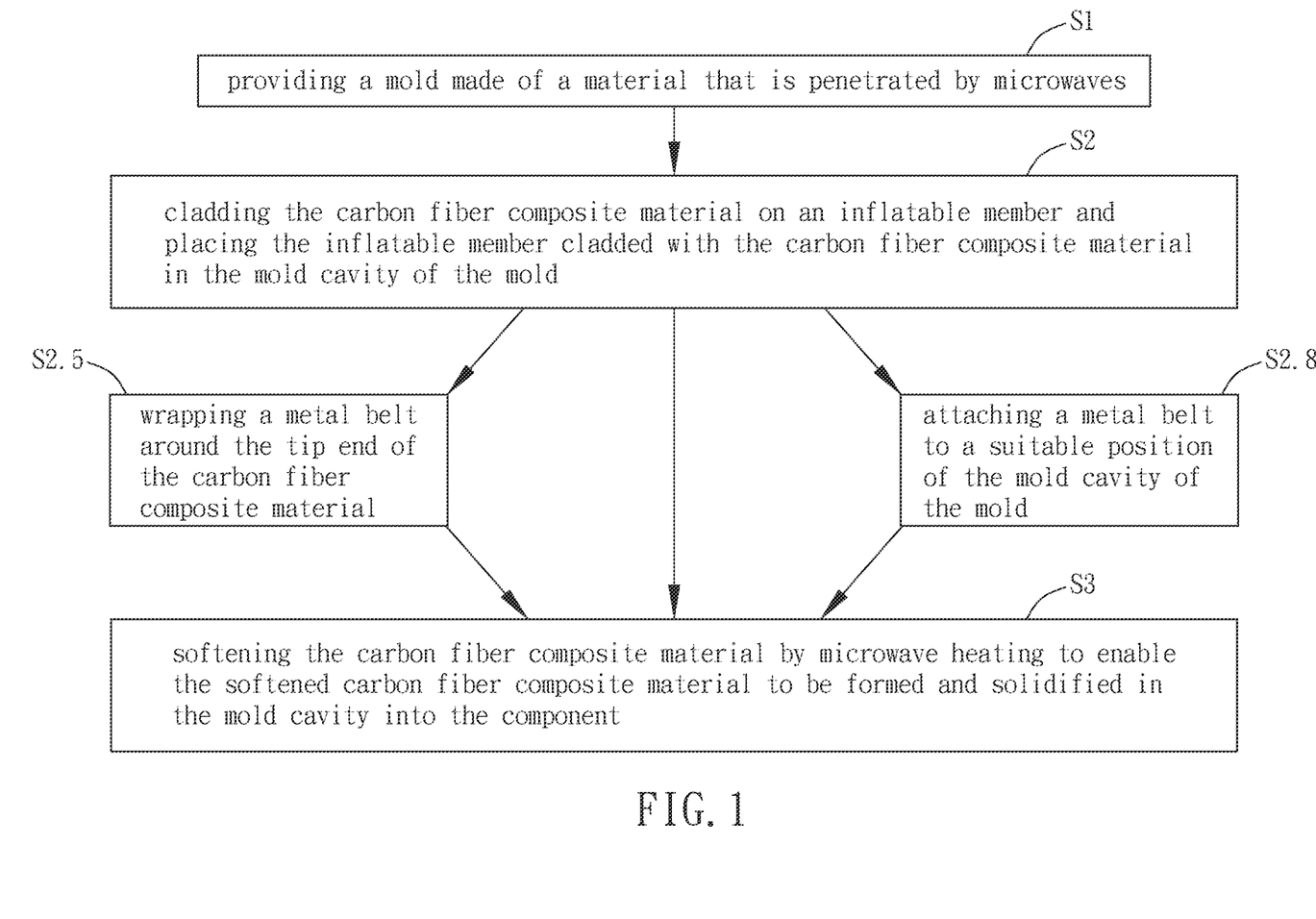
FIG. 1 is a flow chart of a method of manufacturing a component according to a first embodiment of the present invention.
Figure 3:
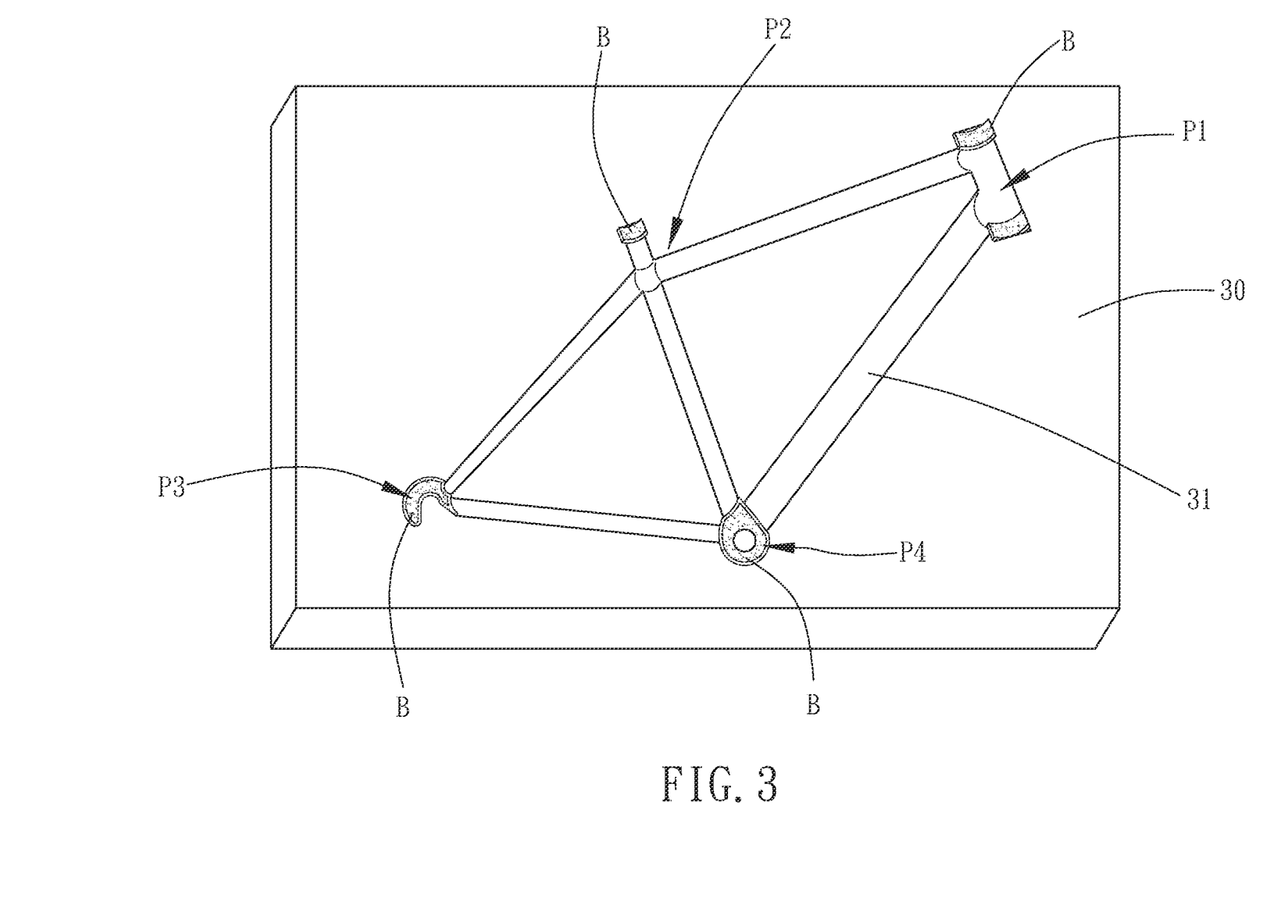
FIG. 3 is a perspective view of half of a mold according to the first embodiment of the present invention.
Figure 4:
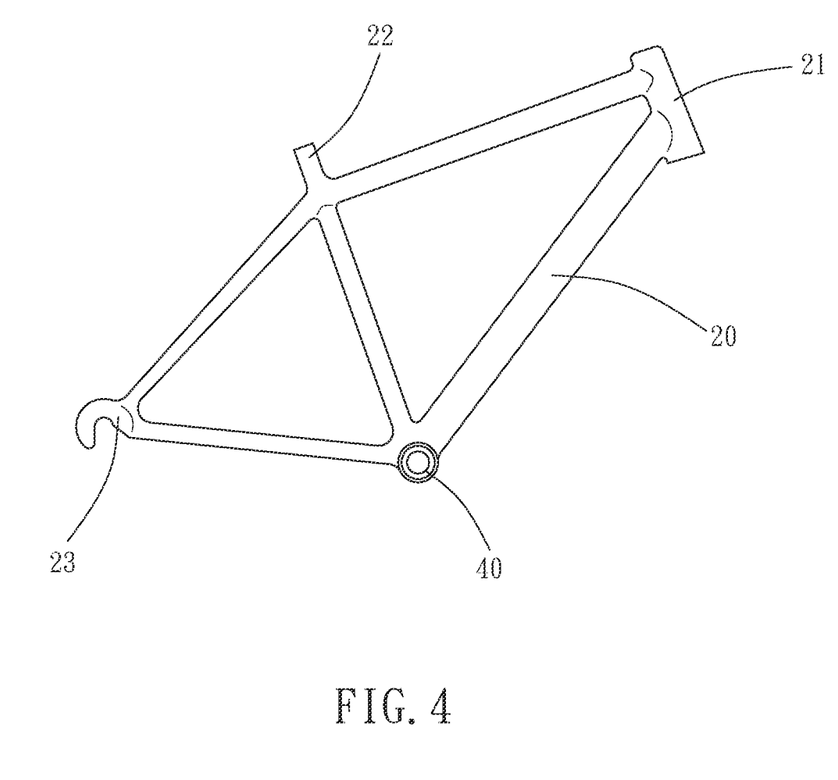
FIG. 4 is a lateral view of the component according to the first embodiment of the present invention.

As shown in FIG. 1, a method according to the first embodiment of the present invention is used to make a carbon fiber composite material 10 capable of absorbing electromagnetic waves in the microwave spectrum into a component (as shown in FIG. 4). In this embodiment, the component is a frame 20 of a bicycle (hereafter referred to as "frame" 20). The method comprises the following steps:

Step S1: providing a mold 30 made of a material that is penetrated by microwaves, such as Teflon, i.e., the material has a relatively low absorption rate with respect to the electromagnetic waves in the microwave spectrum. The mold 30 has a mold cavity 31 inside (as shown in FIG. 3, FIG. 3 only shows half of the mold 30). The configuration of the mold cavity 31 is complementary to the configuration of the frame 20.

Figure 2:
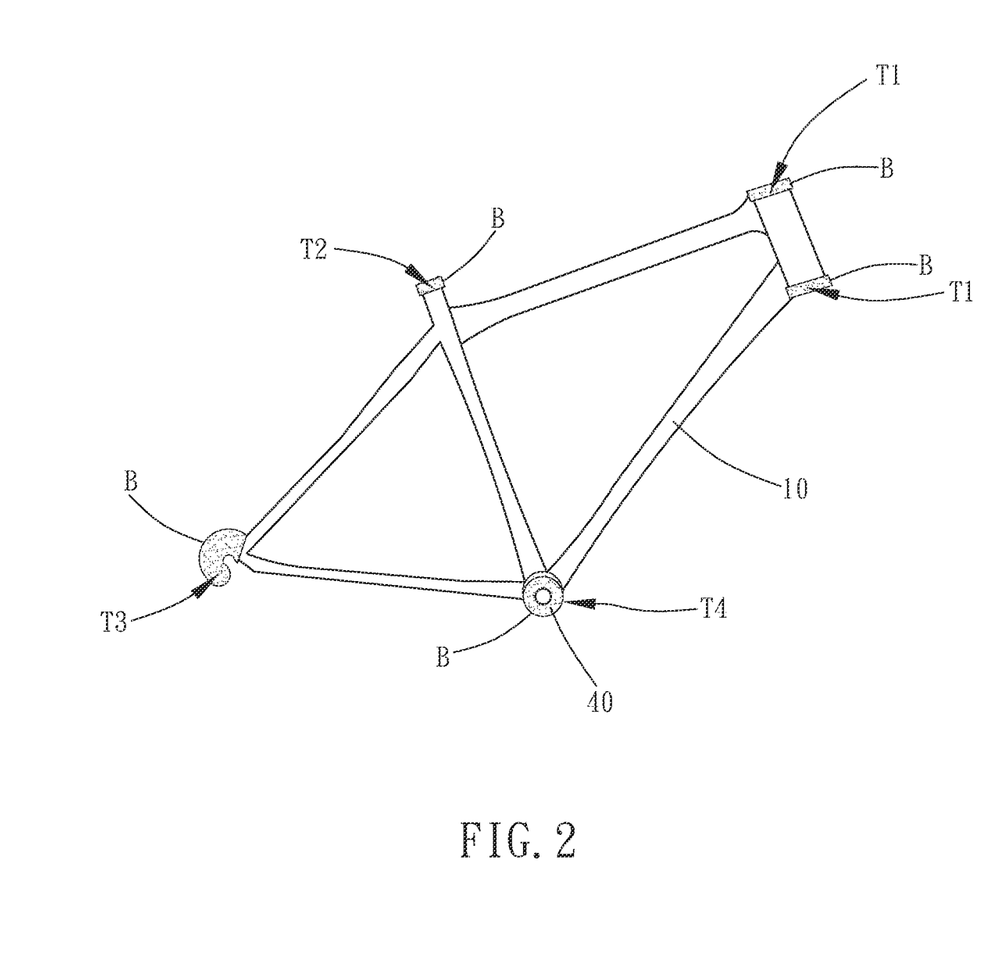
FIG. 2 is a lateral view of a structure formed by the carbon fiber composite materials cladding on the inflatable member according to the first embodiment of the present invention.

Step S2: cladding the carbon fiber composite material 10 on an inflatable member 40 (see FIG. 2) and placing the inflatable member 40 cladded with the carbon fiber composite material 10 in the mold cavity 31 of the mold 30. Generally, the carbon fiber composite material 10 is a thin layered structure, and the inflatable member 40 is cladded with a multi-layered carbon fiber composite material 10. The inflatable member is an airbag. When a high-pressure air is injected into the inflatable member 40 in the subsequent step, the airbag will expand to form the inner wall of the frame 20. After cladding the carbon fiber composite material 10 on the inflatable member 40, the carbon fiber composite material 10 and the inflatable member 40 are placed in the mold cavity 31 of the mold 30 together.

It should be noted that in order to avoid the problem of damaging the mold 30 caused by the phenomenon of tip discharge occurred at the tip of the carbon fiber composite material 10 in the subsequent step of microwave heating, a step 2.5 is executed between step S2 and step S3 to wrap a metal belt B around the tip end T1-T3 of the carbon fiber composite material 10. The metal belt B can be an aluminum foil or a sticking metal tape to prevent the tip end T1-T3 from absorbing the microwaves and prevent tip discharge from occurring at the tip end T1-T3. The tip end T1-T3 of the carbon fiber composite material 10 can be, but not limited to, the to-be-formed end edge of the front tube 21 of the frame 20, the to-be-formed end edge of the seat tube 22, and the to-be-formed end edge of the rear fork 23 (see FIG. 4). Another possible way to avoid tip discharge is that a step 2.8 can be executed selectively. In step 2.8, a metal belt B is attached to a suitable position P1-P3 of the mold cavity 31 of the mold 30 (see FIG. 3). The suitable position P1-P3 is corresponding to the tip end T1-T3 of the carbon fiber composite material 10, such as the to-be-formed end edge of the front tube 21 of the frame 20, the to-be-formed end edge of the seat tube 22, and the to-be-formed end edge of the rear fork 23.

Figure 5:
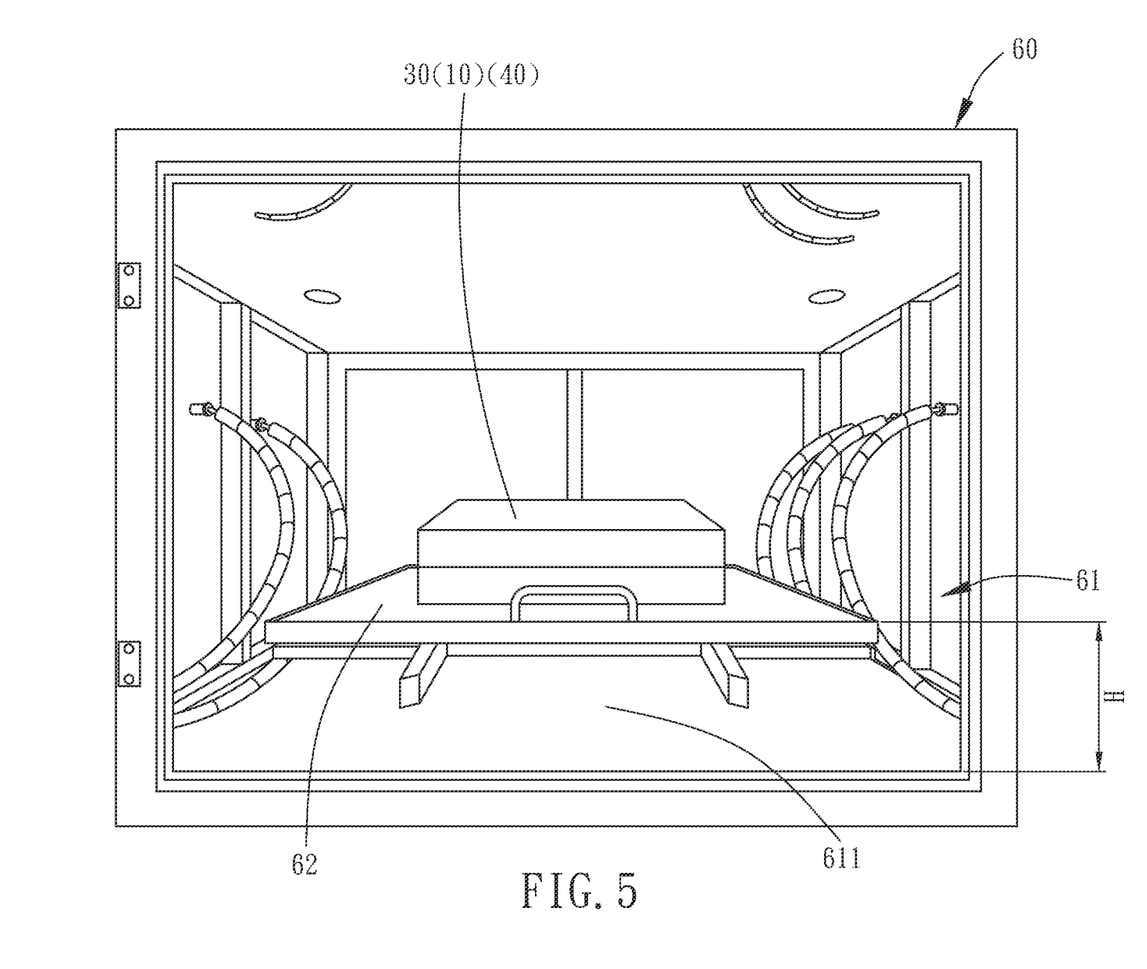
FIG. 5 is a schematic drawing of a microwave oven according to the first embodiment of the present invention.
Figure 6:
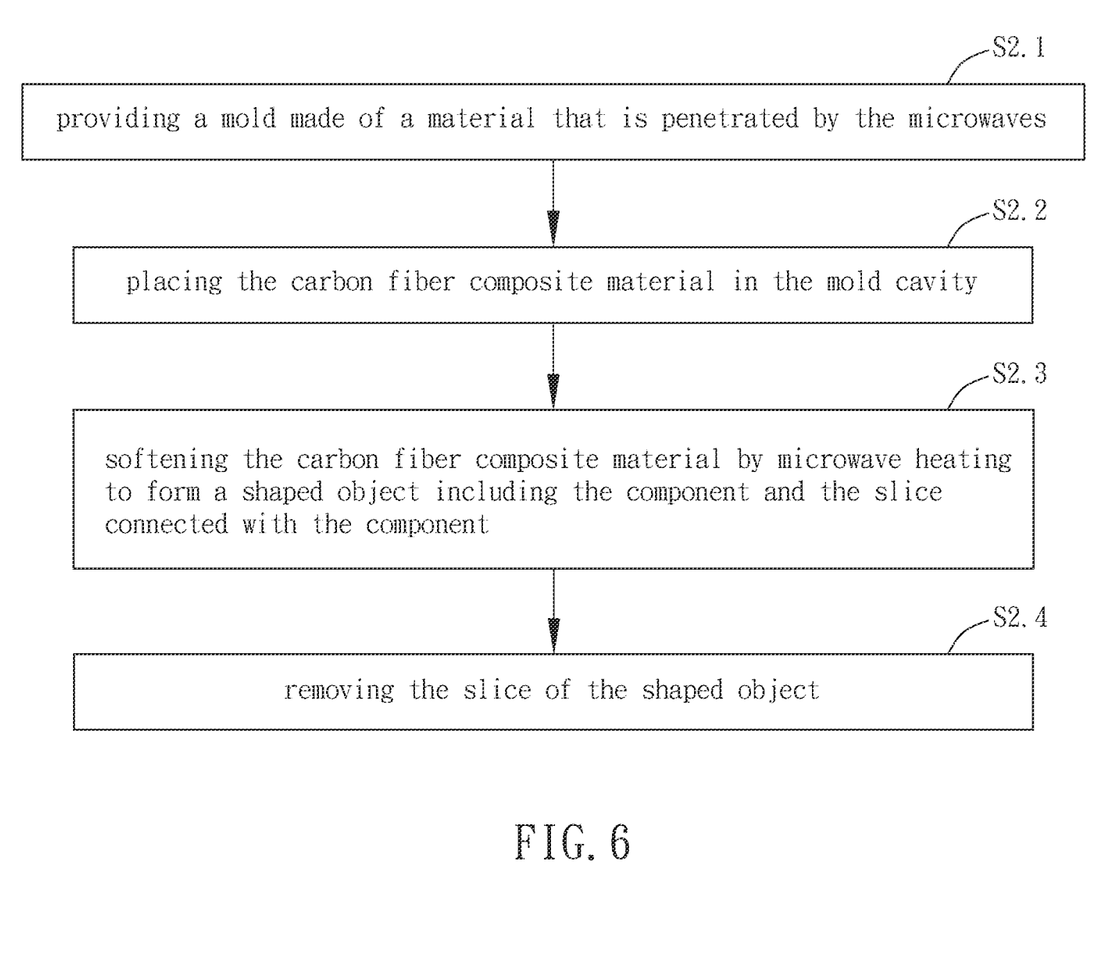
FIG. 6 is a flow chart of the method of manufacturing the component according to a second embodiment of the present invention.

Step S3: softening the carbon fiber composite material 10 by microwave heating, and inflating the softened carbon fiber composite materials 10 through the inflatable member 40 by blow molding for enabling the softened carbon fiber composite materials 10 to be formed and solidified into the component in the mold cavity 31. In this embodiment, a microwave oven 60 is used to heat the carbon fiber composite material 10. As shown in FIG. 5, the microwave oven 60 includes a magnetron (not shown) and a resonant chamber 61. The magnetron is used to generate a microwave signal, and the microwave signal is guided to the resonant chamber 61 for heating the carbon fiber composite material 10 placed in the resonant chamber 61. The resonant chamber 61 has a bottom plate 611 and a platform 62 disposed above the bottom plate 611 and spaced a predetermined height H from the bottom plate 611. The platform 62 is made of materials that can be penetrated by the microwaves so as to prevent from absorbing the microwave signal. Under certain circumstances, the platform 62 may have a plurality of hollow holes (not shown) for allowing the microwave signal reflected by the bottom plate 611 of the resonant chamber 61 to be transmitted to the above of the platform 62 through the hollow holes. The mold 30 is placed on the platform 62 together with the inflatable member 40 cladded with the carbon fiber composite material 10, such that the microwave signal can pass through the mold 30 and be absorbed by the carbon fiber composite material 10, and therefore the carbon fiber composite material 10 is softened by microwave heating. By using the inflatable member 40 to blow the softened carbon fiber composite material 10, the inflatable member 40 will expand and press against the softened carbon fiber composite material 10. Under moderate pressure of the mold 30, the softened carbon fiber composite material 10 is formed in the mold cavity 31 to produce a crosslinking reaction, and finally solidified into the component (the frame 20).

According to the actual test results provided by the inventor, compared to use of the heat medium, the present invention uses the microwaves for heating to reduce the heating time from 40 minutes to about 15 minutes, such that the throughput time of manufacturing the component can be greatly shortened. On the other side, since no heat medium is used, the problem of heat loss due to the thermal energy of the heating medium escaping into the environment will not occur so as to achieve energy saving effect and reduce energy consumption.

Figure 7:
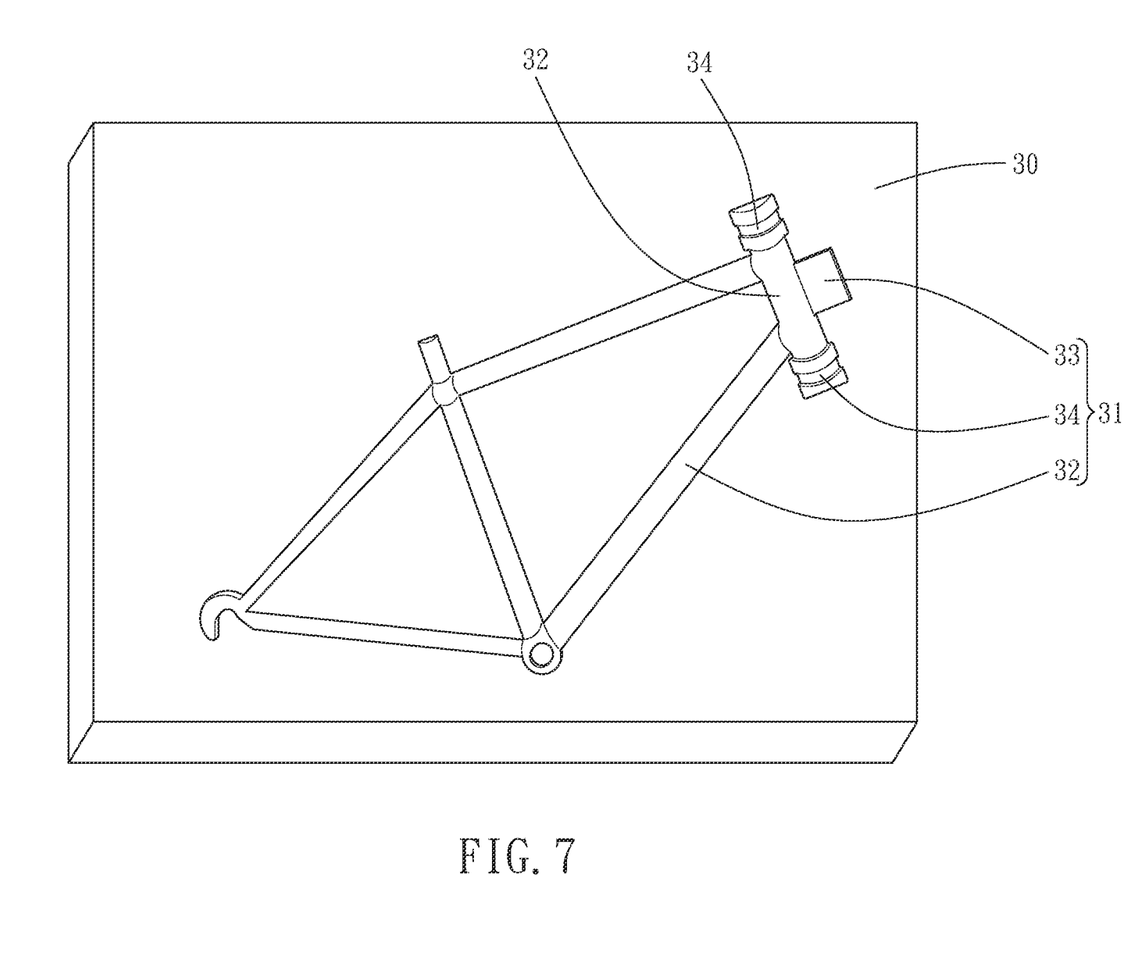
FIG. 7 is a perspective view of half of the mold according to the second embodiment of the present invention.
Figure 12:
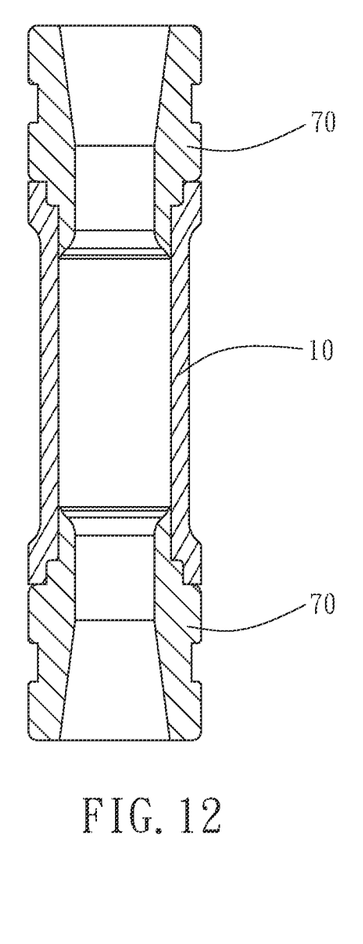
FIG. 12 a sectional view taken along line 12-12 of FIG. 11.
Figure 13:
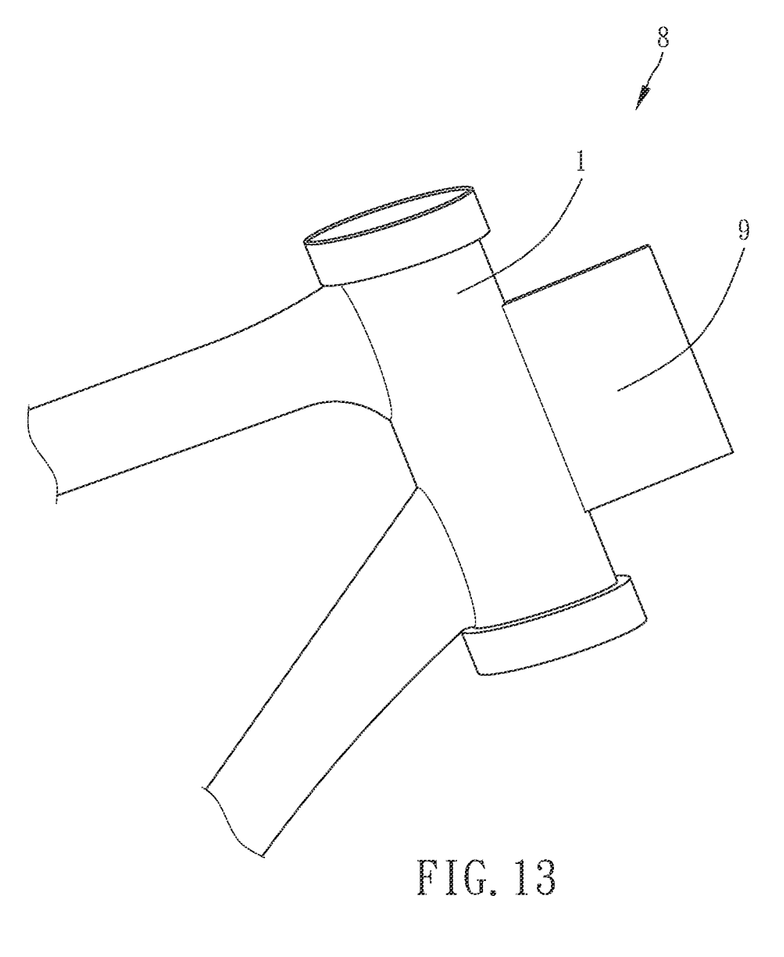
FIG. 13 is a partially perspective view of a shaped object according to the second embodiment of the present invention.
Figure 14:
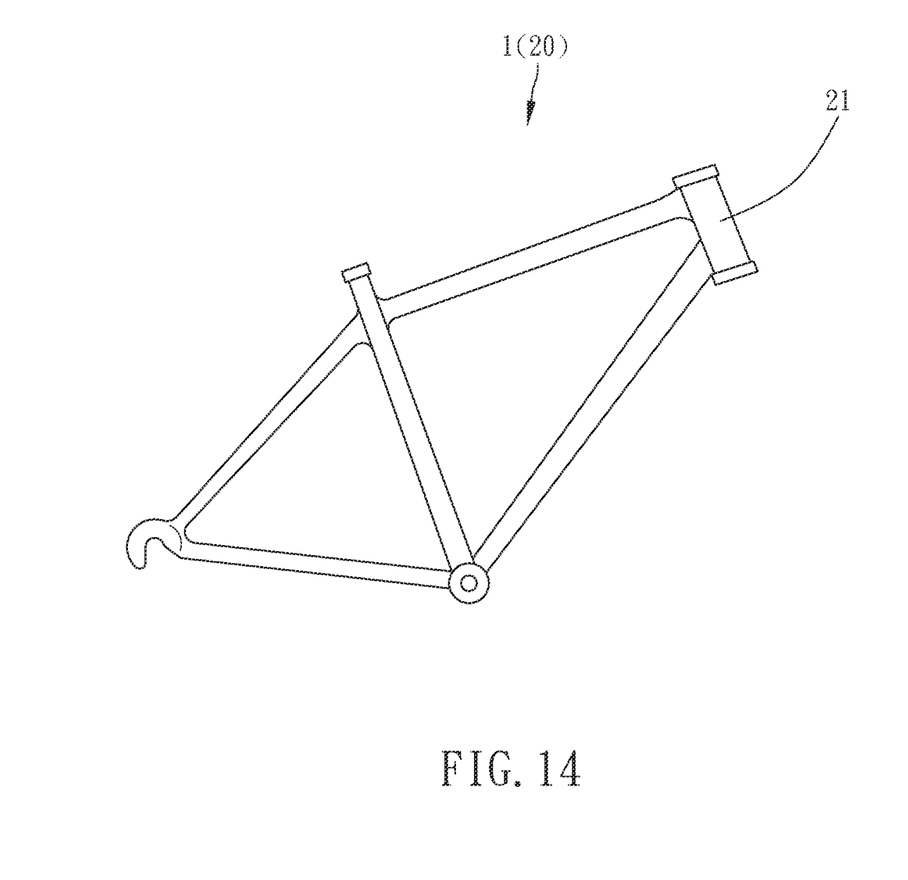
FIG. 14 is a lateral view of the component according to the second embodiment of the present invention

As shown in FIGS. 6 to 14, a method according to the second embodiment of the present invention is also used to make a carbon fiber composite material 10 capable of absorbing electromagnetic waves in the microwave spectrum into a component 1. In this embodiment, the method is used to manufacture a frame 20 of a bicycle as shown in FIG. 14. However, this embodiment is not limited to this example. The method comprises the following steps:

Step 2.1: providing a mold 30 made of a material that is penetrated by the microwaves. The mold 30 has a mold cavity 31 inside (as shown in FIG. 7, FIG. 7 only shows half of the mold 30). The mold cavity 31 is divided into a component forming area 32, a slice forming area 33, and two sleeve receiving areas 34, wherein the configuration of the component forming area 32 is complementary to the configuration of the frame 20, and the slice forming area 33 is connected with the component forming area 32 and corresponding to the middle section of the front tube 21 of the frame 20, and the two sleeve receiving areas 34 are connected with the component forming area 32 and corresponding to the upper and bottom ends of the front tube 21 of the frame 20, respectively. The position of the slice forming area 33 can be adjustable according to the actual structure and size of the to-be-made component 1. Under normal conditions, the carbon fiber composite material 10 corresponding to the middle section of the front tube 21 of the frame 20 is relatively difficult to absorb the microwaves and has a lower temperature, so the slice forming area 33 is set at the position corresponding to the middle section of the front tube 21 of the frame 20 in this embodiment.

Figure 8:
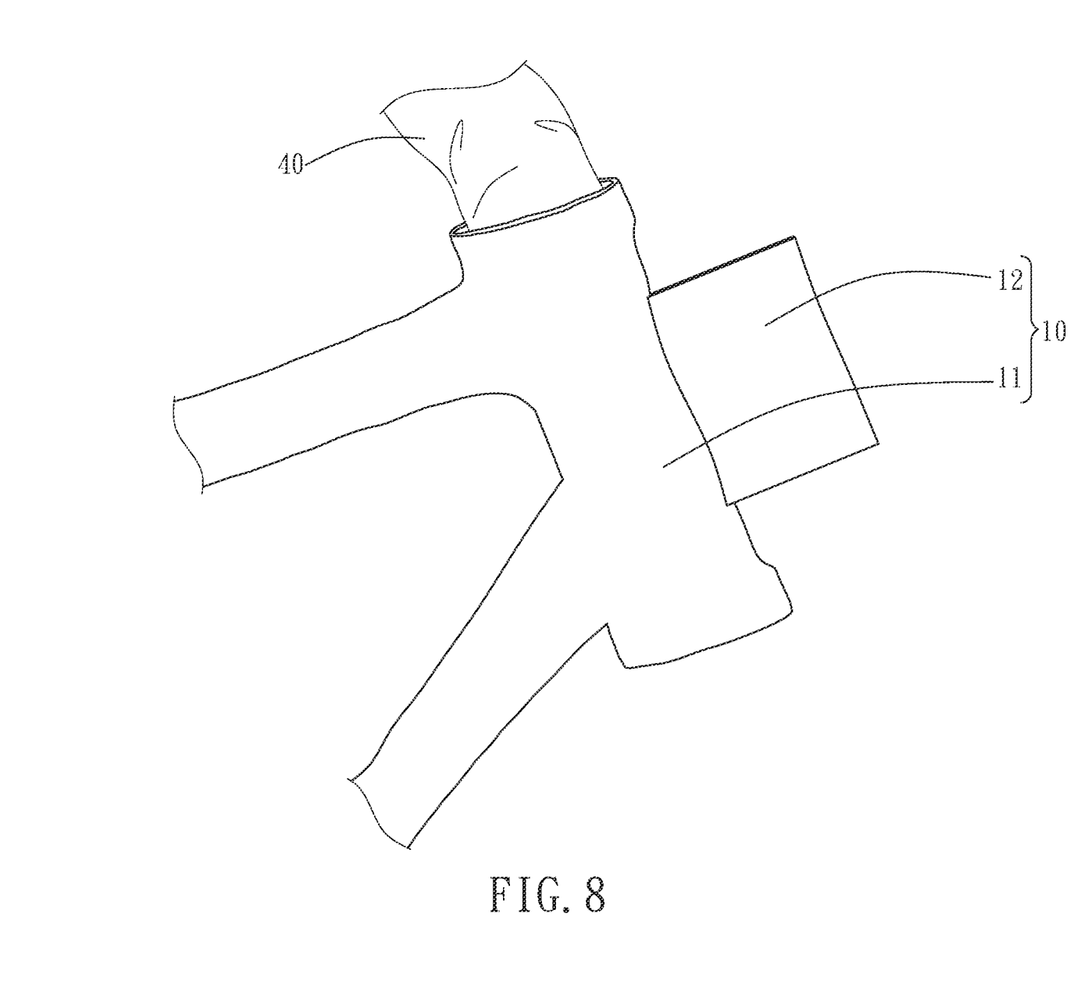
FIG. 8 is a schematic drawing of the carbon fiber composite materials cladding on the inflatable member according to the second embodiment of the present invention.

Step 2.2: placing the carbon fiber composite material 10 in the mold cavity 31. This embodiment is the same as the first embodiment. Because the frame 20 is a hollow structure, an inflatable member 40 is cladded with the carbon fiber composite material 10 to form a carbon fiber composite material body 11, and then a carbon fiber composite material slice 12 is attached to the carbon fiber composite material body 11 (as shown in FIG. 8), and finally the carbon fiber composite material body 11 and the carbon fiber composite material slice 12 are placed in the mold cavity 31 together, wherein the carbon fiber composite material body 11 is placed correspondingly in the component forming area 32 and the carbon fiber composite material slice 12 is placed correspondingly in the slice forming area 33.

Figure 9:
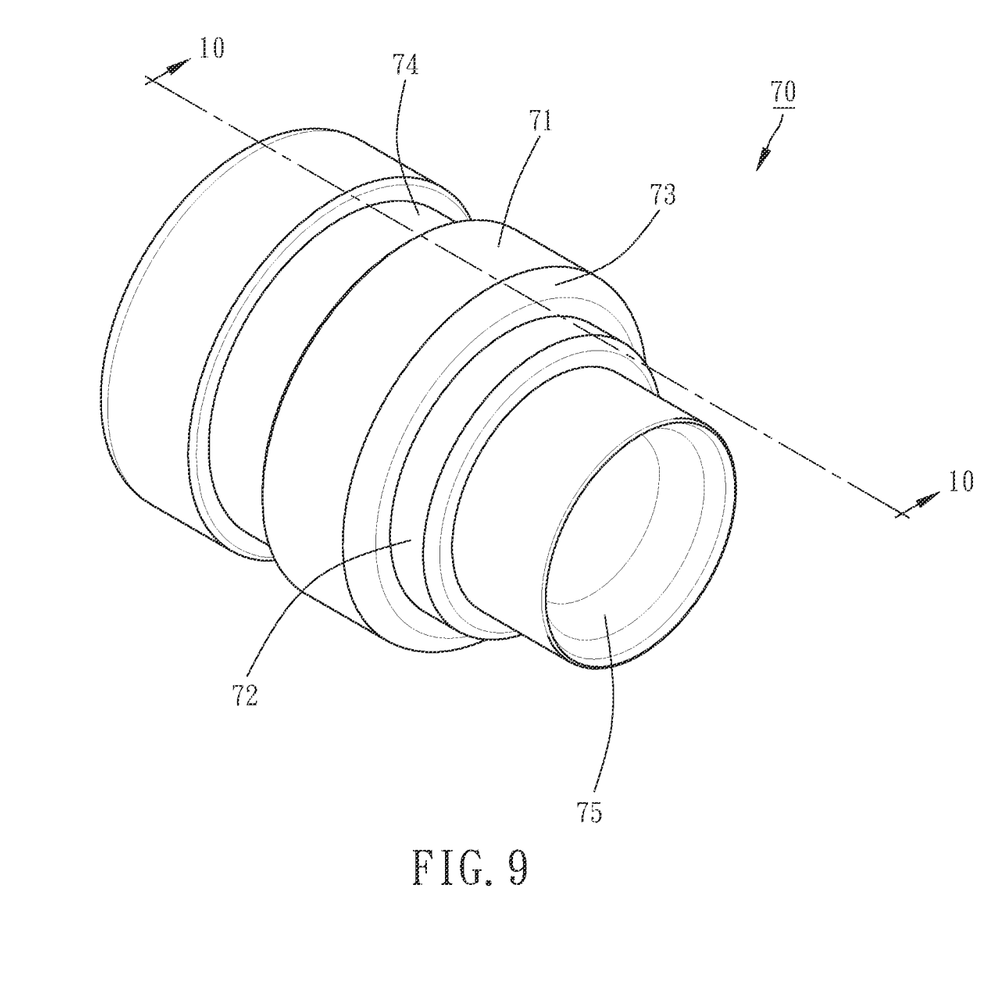
FIG. 9 is a perspective view of a metal sleeve according to the second embodiment of the present invention.
Figure 10:
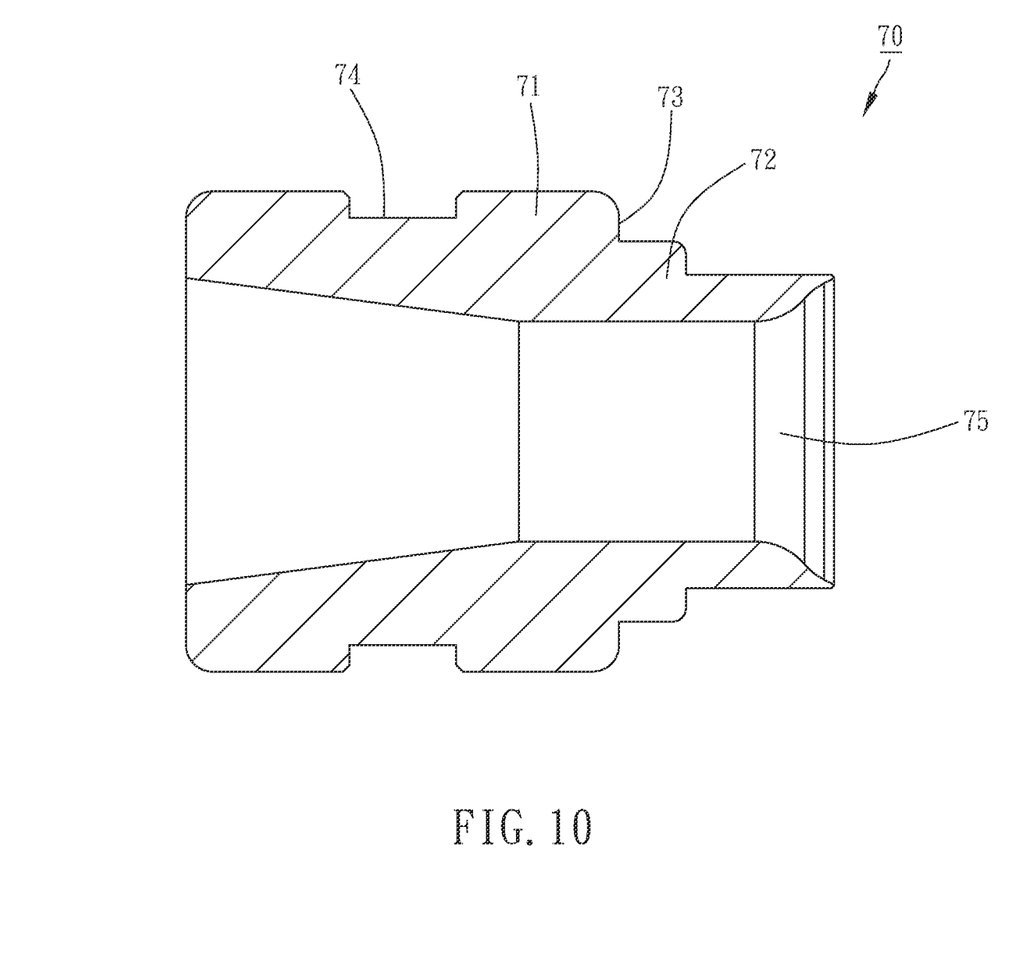
FIG. 10 is a sectional view taken along line 10-10 of FIG. 9.
Figure 11:
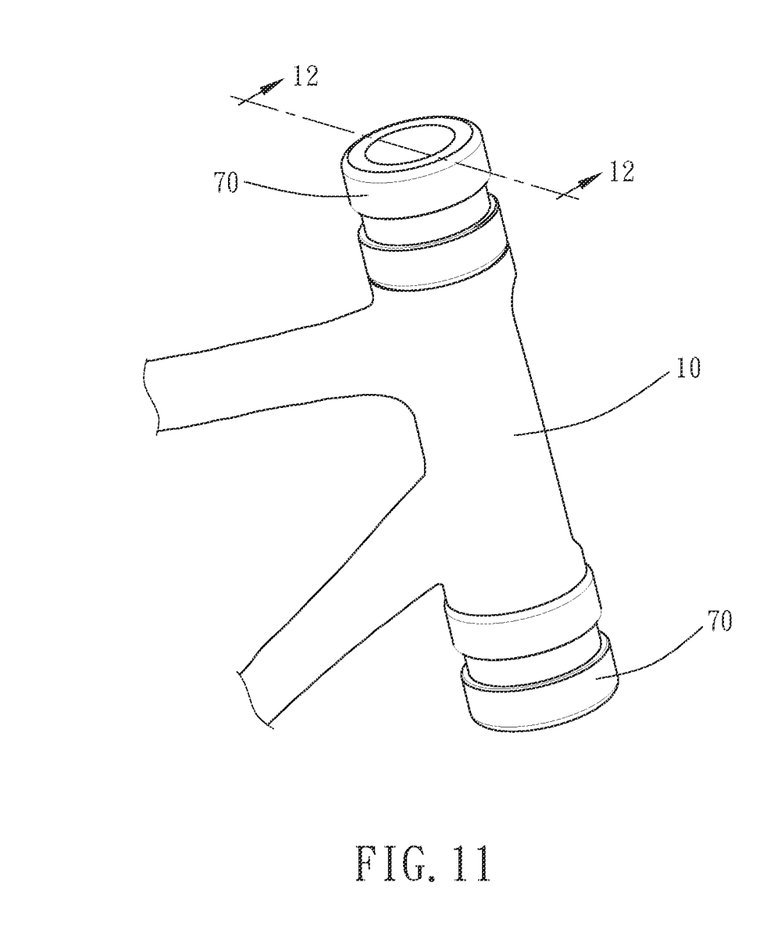
FIG. 11 is a schematic drawing according to the second embodiment of the present invention, showing the carbon fiber composite materials is assembled with two metal sleeves.

In order to avoid the problem of damaging the mold 30 caused by the phenomenon of tip discharge occurred at the tip of the carbon fiber composite material 10 in the subsequent step of microwave heating, in step 2.2, two metal sleeves 70 are installed on the portions of the carbon fiber composite material 10 corresponding to the upper and bottom ends of the front tube 21 (as shown in FIGS. 11 and 12). Referring to FIG. 9 and FIG. 10 in particular, the metal sleeves 70 each have a large diameter portion 71, a small diameter portion 72, and a through hole 75. The large diameter portion 71 has an abutting flange 73 located at a junction of the large diameter portion 71 and the small diameter portion 72. When the end edge of the carbon fiber composite material 10 is abutted against the abutting flange 73 of the large diameter portion 71, the end edge of the carbon fiber composite material 10 do not protrude from the large diameter portion 71 and is partially shielded by the large diameter portion 71. After installation of the metal sleeves 70, the metal sleeves 70 are placed in the mold cavity 31 together with the carbon fiber composite material 10 and the inflatable member 40, wherein the metal sleeves 70 are placed in the sleeve receiving areas 34. In addition, a flow channel 74 is provided on the outer surface of each of the large diameter portions 71, and the mold 30 has a coolant channel (not shown) communicated with the flow channel 74.

Step 2.3: softening the carbon fiber composite material 10 in the mold 30 by microwave heating for enabling the softened carbon fiber composite materials 10 to produce a crosslinking reaction in the mold cavity 31 and be formed into a shaped object 8 (as shown in FIG. 13). In this embodiment, the microwave oven is also used for heating. During the process of softening the carbon fiber composite material 10, a hollow structure is formed in the shaped object 8 by the expansion of the inflatable member 40. The shaped object 8 includes the to-be-obtained component 1 and a slice 9 connected with the component 1. The component 1 is formed by the carbon fiber composite material body 11, and the slice 9 is formed by the carbon fiber composite material slice 12. The component 1 is formed in the component forming area 32 of the mold 30, and the slice 9 is formed in the slice forming area 33 of the mold 30. After that, a coolant is injecting into the flow channels 74 through the coolant channel for cooling the metal sleeves 70 and the shaped object 8, thereby solidifying the shaped object 8.

Step 2.4: using a cutting tool to remove the slice 9 of the shaped object 8 to obtain the component 1 unconnected with the slice 9, such that the component 1 is manufactured by the method of the present invention (as shown in FIG. 14).

It can be understood from the above illustration that the method of the embodiment uses the slice 9 with the characteristics of larger area and absorbing the microwaves easily to transfer heat quickly to a low temperature area of the component 1 (the low temperature area is usually located at the central of the component 1 or an area that easily reflects the microwaves) during the process of microwave heating, such that each part of the component 1 can reach a uniform temperature quickly and reach the temperature to produce the crosslinking reaction, thereby effective shortening the throughput time of manufacturing the component 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method of manufacturing a component by using a carbon fiber composite material capable of absorbing microwaves, comprising the steps of:

providing a mold made of a material that is penetrated by the microwaves and has a mold cavity inside with a component forming area and a slice forming area connected with the component forming area;

placing the carbon fiber composite material in the mold cavity;

softening the carbon fiber composite materials by microwave heating to enable the softened carbon fiber composite material to be formed into a shaped object in the mold cavity, and solidifying the shaped object, wherein the shaped object includes the component formed in the component forming area and a slice connected with the component and formed in the slice forming area, and the slice has a characteristic of enhancing absorbing microwave; and removing the slice of the shaped object to obtain the component unconnected with the slice;

wherein the slice has a shape of rectangular sheet.

2. The method as claimed in claim 1, wherein the step of placing the carbon fiber composite material in the mold cavity further comprises cladding the carbon fiber composite material on an inflatable member and placing the inflatable member cladded with the carbon fiber composite material in the mold cavity; in the step of softening the carbon fiber composite material by microwave heating further comprises inflating the softened carbon fiber composite materials through the inflatable member by blow molding.

3. The method as claimed in claim 2, wherein the step of placing the inflatable member cladded with the carbon fiber composite material in the mold cavity further comprises installing the carbon fiber composite material on a metal sleeve; the metal sleeve has a large diameter portion and a small diameter portion connected with the large diameter portion, and the carbon fiber composite material has an end edge thereof abutted on an abutting flange of the large diameter portion of the metal sleeve; in the step of placing the carbon fiber composite material in the mold cavity further comprises placing the metal sleeve together with the carbon fiber composite material and the inflatable member in the mold cavity, wherein the metal sleeve is located at a sleeve receiving area of the mold cavity.

4. The method as claimed in claim 3, wherein the inflatable member passes through a through hole of the metal sleeve in the step of placing the inflatable member cladded with the carbon fiber composite material in the mold cavity.

5. The method as claimed in claim 3, wherein in the step of solidifying the shaped object further comprises injecting a coolant into a flow channel of the metal sleeve for cooling the metal sleeve and the shaped object so as to solidify the shaped object.

6. The method as claimed in claim 1, wherein the component is a front tube of a bicycle frame and the slice has a size smaller than the front tube of a bicycle frame.

* * * * *